(12) United States Patent
Middleton (10) Patent No.: US 8,353,237 B2
(45) Date of Patent: Jan. 15, 2013

(54) CARTRIDGE FOR STORE EJECTION FROM AIRCRAFT

(75) Inventor: Paul Anthony Gerald Middleton, Dorset (GB)

(73) Assignee: Flight Refuelling Limited, Dorset (GB)

(*) Notice: Subject to any disclaimer, the term of this patent is extended or adjusted under 35 U.S.C. 154(b) by 1280 days.

(21) Appl. No.: 12/052,360

(22) Filed: Mar. 20, 2008

(65) Prior Publication Data

US 2008/0307952 A1 Dec. 18, 2008

(30) Foreign Application Priority Data

Mar. 22, 2007 (GB) .................................. 0705528.8

(51) Int. Cl.
*F41F 5/00* (2006.01)
(52) U.S. Cl. ....................................................... 89/1.57
(58) Field of Classification Search .................. 102/440; 89/1.57

See application file for complete search history.

(56) References Cited

U.S. PATENT DOCUMENTS

| | | | | |
|---|---|---|---|---|
| 4,043,525 A | * | 8/1977 | Jakubowski, Jr. ........... | 244/137.4 |
| 4,246,472 A | * | 1/1981 | Sun et al. ....................... | 235/401 |
| 4,343,447 A | * | 8/1982 | Reed, III .................... | 244/137.4 |
| 4,388,853 A | * | 6/1983 | Griffin et al. ................... | 89/1.57 |
| 4,543,873 A | * | 10/1985 | Stock ............................... | 89/1.59 |
| 5,036,466 A | * | 7/1991 | Fitzgerald et al. ............ | 235/400 |
| 5,088,664 A | | 2/1992 | Ellis et al. | |
| 5,218,165 A | * | 6/1993 | Cornelius et al. ............. | 102/378 |
| 5,411,225 A | | 5/1995 | Lannon et al. | |
| 5,487,322 A | * | 1/1996 | Rhodes ........................... | 89/1.56 |
| 5,583,312 A | * | 12/1996 | Jakubowski, Jr. ............. | 89/1.54 |
| 6,347,768 B1 | | 2/2002 | Jakubowski, Jr. et al. | |
| 7,506,569 B1 | * | 3/2009 | Burnett et al. .................. | 89/1.51 |
| 7,946,208 B1 | * | 5/2011 | Howard et al. ................ | 89/1.57 |
| 2004/0159739 A1 | | 8/2004 | Jakubowski, Jr. | |

OTHER PUBLICATIONS

International Search Report and Written Opinion mailed Aug. 27, 2008, for corresponding PCT International Application No. PCT/GB2008/000991 (9 pages).
International Preliminary Report on Patentability issued Mar. 23, 2009, for corresponding PCT International Application No. PCT/GB2008/000991 (7 pages).

* cited by examiner

*Primary Examiner* — Bret Hayes
*Assistant Examiner* — Reginald Tillman, Jr.
(74) *Attorney, Agent, or Firm* — Finnegan Henderson Farabow Garrett & Dunner LLP (57) ABSTRACT

The present invention relates to the field of store ejection from aircraft. More specifically it relates to cartridges used in ejector release units for stores. The invention aims to provide a cartridge that can be used in existing ejector release units that overcomes some of the problems (such as; only a one-time use, the need for cleaning of ejector units, the erosion of ejector units and the need for a holder to be used) of pyrotechnic or hot gas cartridges but without compromising performance. The present invention provides a cartridge for use in an ejector release unit, the cartridge comprising a gas chamber for containing gas under pressure, an outlet of the gas chamber for releasing the compressed gas to drive a release mechanism in the ejector release unit, and a release valve associated with the outlet and arranged to be operable to open the outlet upon activation of a firing pin of an ejector release unit. An ejector release unit containing such a cartridge or pair of cartridges is also provided.

20 Claims, 5 Drawing Sheets

CARTRIDGE FOR STORE EJECTION FROM AIRCRAFT

The present invention relates to the field of store ejection from aircraft. More specifically it relates to cartridges used in ejector release units for stores.

Ejector release units are used on aircraft both to release and eject stores from the aircraft, for example in weapons carriage systems. Stores need to be ejected away from the aircraft when they are released. This is because stores are carried as close to the aircraft as possible for aerodynamic reasons. However, when the stores are released, they are subjected to turbulence from the aircraft. This could cause the store to bounce into the aircraft and cause structural damage. Ejecting the store away from the aircraft ensures a safe separation distance when the store enters flight.

Numerous mechanisms are known for ejecting stores from aircraft. Commonly these mechanisms, known as ejector release units (or ERUs), use pyrotechnic or hot gas cartridges to provide a large release of pressure upon ignition. The cartridges are mounted in a breech, and the pressure is used to drive piston release mechanisms to release and eject the store from the aircraft. Hot gas cartridges are able to eject stores very quickly. However, they cannot be re-used, and furthermore combustion products tend to build up within the gas system requiring cleaning regularly. This cleaning involves taking the whole ejector release unit off the aircraft, including the disconnection and re-connection of electrical connectors and subsequent testing. This is a complicated and expensive maintenance process. Furthermore, the blast produced by the hot gas cartridges tends to erode the surfaces of the ejector release unit. Hence, these surfaces have to be made of a hard material in order to resist the erosion. The ejector release units also have to be rigid in order to resist the thermal shock and pressure impulse caused by the blasts. Hot gas cartridges also require a holder. The hot gas cartridge is placed inside a holder before the holder is screwed into the ejector release unit.

Hot gas cartridges are frequently used to eject dummy stores as part of pilot training on aircraft. In this case, a hot gas cartridge is used in a specially adapted single ejector release unit. The hot gas cartridge is placed inside a holder which screws into the breech of the single ejector release unit. Many hot gas cartridges are used in this way since more cartridges are fired in practice than are fired for releasing stores in a "real-life" situation. The most common ejector release units for "real-life" situations contain twin breeches, requiring two hot gas cartridges. Although the cartridges are standard sizes, the holders for these twin breech BRUs require different screw threads from those used with the single breech ejector unit.

Another way of ejecting stores is to use gas from the aircraft pneumatics system. Hence, instead of using pyrotechnic cartridges in an ejector release unit, compressed air is fed directly into the unit. As cartridges are not used, the ejector release units that use hot gas cartridges are not suitable for use with compressed air from the aircraft. It is necessary to use specially adapted ejector release units in order to use gas from the aircraft pneumatics system. Furthermore, the aircraft must be specifically adapted to provide the compressed air.

This invention aims to provide a cartridge that can be used in existing ejector release units that overcomes some of the problems of pyrotechnic or hot gas cartridges but without compromising performance.

According to one aspect of the present invention there is provided a cartridge for use in an ejector release unit, the cartridge comprising a gas chamber for containing gas under pressure, an outlet of the gas chamber for releasing the compressed gas to drive a release mechanism in the ejector release unit, and a release valve associated with the outlet and arranged to be operable to open the outlet upon activation of a firing pin of an ejector release unit.

The cartridge is preferably suitable for use with existing ejector release units. Therefore, the cartridge may be adapted to be secured into the breech of an existing ejector release unit, in place of a hot gas cartridge. For example, the cartridge may have an electrode arranged to be aligned with the firing pin of an ejector release unit.

The release valve is preferably electrically operable and may comprise, for example, a solenoid and electromagnet. The release valve may be also be operable independently of operation from the solenoid and electromagnet in an opening direction. For example, the electrical operation of the release valve may be overridden by pressure operation of the valve. This may allow for sympathetic firing between two cartridges in a breech, since pressure released by one cartridge firing may operate the other cartridge to fire.

A pair of cartridges in an ejector release unit breech are required to be able to "sympathetically" fire, i.e. a cartridge that does not fire must be activated by the other cartridge firing. Whilst with hot gas cartridges, this is readily achieved by the explosion of one cartridge into the other, this is not so for cold gas cartridges. It is imperative that both cartridges in a breech fire simultaneously to supply sufficient energy in order to release the store effectively. Otherwise, the store could be only partially released, or could hit the aircraft and cause structural damage.

There may be a latch associated with the release valve and/or electromagnet to maintain the release valve in an "open" position.

Advantageously, the release valve may be capable of being re-closed such that the used cartridge may be re-charged with compressed gas for re-use.

In one example, the gas chamber includes a charging valve which may be a one-way valve. The charging valve is conveniently located at the opposite end of the cartridge from the release valve. Conveniently, the charging valve may also be capable of releasing gas from the chamber such that the gas can be almost completely discharged via the charging valve. The chamber may be recharged from empty or "topped up" from a partially empty state via the charging valve. It is preferred to store the cartridges in an empty condition.

Preferably, the cartridge comprises a pressure indicator, which indicates when the gas inside the gas chamber exceeds a certain pressure level. For example, this is the pressure level required in the gas chamber, at an ambient temperature, in order to produce sufficient pressure upon escape to drive the release mechanism in all anticipated conditions of release. Hence, the pressure indicator indicates whether the cartridge is at a pressure state suitable for use in an ejector release unit and/or whether the cartridge has been fired. The pressure indicator is conveniently on the outside of the cartridge and located at the same end of the cartridge as the charging valve.

The cartridge may comprise a screw thread for securing the cartridge to a corresponding screw thread within the ejector release unit breech. The cartridge may also comprise an arrangement, such as a hexagonal drive socket, for applying torque to the cartridge in order to screw it in place in the ejector release unit breech.

The cartridge may also comprise a seal arranged for preventing released pressurised gas from coming into contact with, and therefore prevent damage of, the firing pin of an ejector release unit breech.

The gas chamber may be suitable for filling with dry air, filtered dry air or nitrogen.

The cartridge may comprise a bleed air passage communicating with the release valve. The bleed air passage may be such that it can operate to open the release valve upon receiving pressurised gas to facilitate sympathetic firing by another cartridge. For example, the release valve preferably comprises a valve member and the bleed air passage is in fluid communication with a surface of the release valve member so that pressurised gas received in the bleed air passage acts on that surface to force the release valve member to move away from the bleed air passage. The bleed air passage may be in fluid communication with the same side of the release valve member as the gas chamber. For example, the surface is a second surface of the release valve member which is on the same side of the release valve member as a first surface, said first surface being in fluid communication with the gas chamber outlet.

A pair of cartridges as described above may be connected or located in the breech in such a way that the bleed air passage of one cartridge is in fluid communication with air escaping from the chamber of the other cartridge. Hence, a proportion of the pressurised gas escaping from one of the cartridges is received in the bleed air passage of the other cartridge, so as to act on a second surface of the release valve member of the other cartridge to force the release valve to open. Hence, if the release valve of one of the cartridges fails to open upon activation of the firing pin, it will be opened by the pressurised gas escaping from the other cartridge.

The release valve member may be contained within a release valve chamber of the cartridge adjacent the gas chamber. The release valve member may have a gas passage extending through the release valve member between the gas chamber and release valve chamber. Hence, in the closed position of the release valve member, gas from the gas chamber can pass through the release valve member into the release valve chamber providing equal gas pressure on either side of the release valve member. This gas pressure acts on a larger closing area and therefore forces the valve closed. The release valve member can also or alternatively be held in its closed position by a biasing member such as a spring. The biasing member may be contained in the release valve chamber.

The release valve chamber may comprise two sections; the first section receiving gas from the gas chamber, and a second section separated from the first section by a portion of the release valve member and only in limited fluid communication with first section I.e. the two sections of the release valve chamber are substantially sealed from one another.

The electromagnet may be contained in another chamber. The electromagnet chamber may communicate with the first section of the release valve chamber via an internal passage. Hence, the electromagnet chamber receives gas from the gas chamber.

The cartridge may comprise a vent passage extending to the outside of the cartridge allowing gas to vent out of the cartridge. The vent passage may comprise a hole in the vicinity of the screw thread of the cartridge and a broken section of thread in the cartridge or ejector release unit breech.

The vent passage may communicate with the electromagnet chamber when the electromagnet is in an "open" position. Hence, gas within the electromagnet chamber can vent out when the release valve has been operated by activation of the firing pin in the ejector release unit.

The vent passage may communicate with the second section of the release valve chamber. Hence, gas that escapes from the first section to the second section of the release valve chamber can be vented out of the cartridge. This provides a slow-time vent, as gas can only slowly travel from the first to second section of the release valve chamber.

The cartridge may be such that internal passages and chambers within the cartridge are sealed by the walls of the cartridge.

According to another aspect of the present invention, there is provided an ejector release unit for an aircraft comprising a cartridge as described above.

According to another aspect of the present invention, there is provided an ejector release unit for an aircraft comprising a pair of cartridges as described above.

According to another aspect of the present invention, there is provided a single ejector release unit for an aircraft comprising a cartridge as described above.

Embodiments of the present invention will now be described, by way of example only, with reference to the accompanying drawings, in which.

Figure 1A:
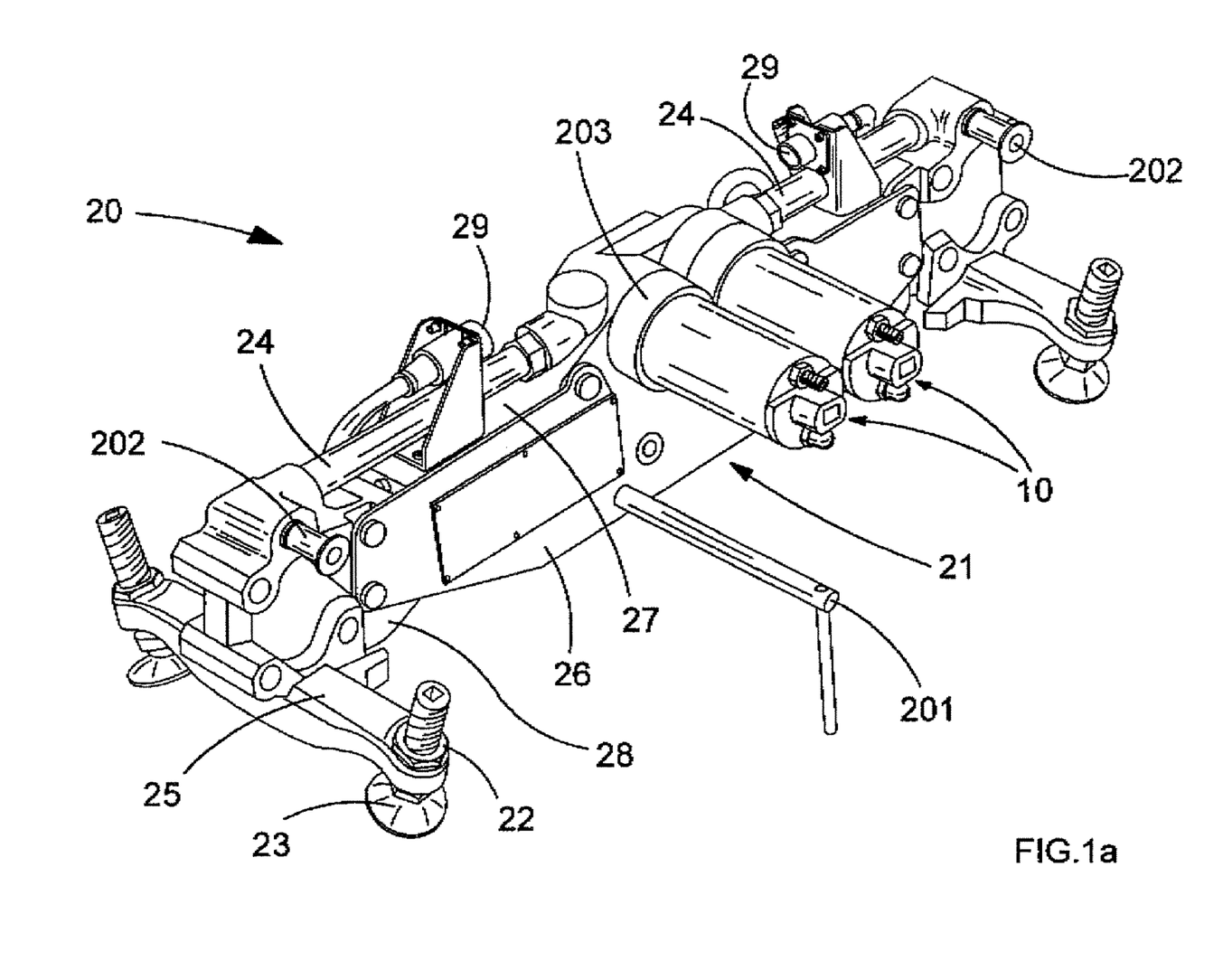
FIG. 1a shows an ejector release unit suitable for use with a pair of cartridges according to the invention.

Referring to FIG. 1a, an ejector release unit 20 comprises an elongate main body portion 21. The main body portion comprises two sideplates 26 sandwiching an operating mechanism (not shown). The main body portion 21 also comprises a top cover 27. Two electrical connectors 29 are located above the top cover 27. These connectors connect with the electrical system of the aircraft. These communicate the "state" of the unit 20 to the main control panel of the aircraft (i.e. whether the store is on or off station). For example, they can indicate when a store (not shown) has been released. The electrical connectors 29 also deliver a firing pulse from the aircraft cockpit to the ejector release unit 20.

At each end of the main body portion 21 is located a crutch arm 25 extending transversely past each sideplate 26. Each end of each crutch arm is provided with a crutch pad 23 connected to the corresponding end of the crutch arm 25 by a locknut 22. The crutch pads 23 face generally downwardly away from the unit 20 for touching down on the store (not shown) mounted on the ejector release unit. The angle of the crutch pad 23 in relation to the unit 20 automatically adjusts to correspond to the profile of the store at the location of the pad. The crutch pads 23 can also be lowered and raised in relation to the store by adjusting the locknuts 22.

The ejector release unit 20 also comprises two hooks 28, each located towards an opposite end of the main body portion 21 on the underside thereof. The hooks 28 are located adjacent the crutch arms 25 and facing outwardly. The hooks 28 are pivotally mounted outwardly for hooking onto a store lug on the store. Hence, the crutch pad 23 and hook 28 combination secures the store and prevents it from swaying.

Each hook 28 is linked to an operating arm (not shown) via a connecting rod (not shown). Each connecting rod is generally located towards the bottom of the main body portion 21 of the ejector release unit 20, between the sidewalls 26. The rods are pivotally connected one to each end of the operating arm. The operating arm can turn about its centre at a location in the centre of the lower half of the unit 20. Upon being actuated by an ejector piston (not shown), the operating arm pivots from a generally horizontal orientation to a generally vertical orientation and acts to pull the connecting rods inwards towards the centre of the unit. Hence, the hooks 28 are pulled inwardly and pivot to face downwards in relation to the unit 20, thus allowing the store lug to be released from the hooks 28.

The ejector release unit 20 in FIG. 1a is shown with a ground safety pin 201 inserted. The ground safety pin 201 prevents the operating arm from pivoting into its generally vertical position and thus prevents the hooks 28 from releasing the store on the ground.

The ejector release unit 20 mounts two generally cylindrical cartridges 10 which are secured into a breech chamber 203 in a region slightly off-centre of its main body portion 21. The cartridges 10 are mounted side by side and are orientated across the main body portion 21. The cartridges are interconnected by a duct (not shown) in the upper part of the breech chamber 203. The cartridges communicate with two gas tubes 24 one tube running along each side of the top of the main body portion 21 above the top cover 27. Each gas tube 24 connects with an ejector piston at the corresponding end of the unit 20.

A throttle 202 is located on each gas tube 24 towards the ejector piston for adjusting the gas flow. The throttle can be adjusted, for example, by using a hexagonal drive. The throttle comprises two passages. One passage is an oblique passage leading from the gas tube 24. The second passage is a vertical passage leading to the ejector piston. The ejector pistons are located vertically in the ends of the unit 20. They are sprung loaded to touch the store and upon actuation extend downwards through the unit 20 to act to push the store away from the unit. The unit 20 is designed so that the ejector pistons are to push marginally before the hooks 28 release the store. This is to ensure that the store is positively directed away from the aircraft on release.

Figure 1B:
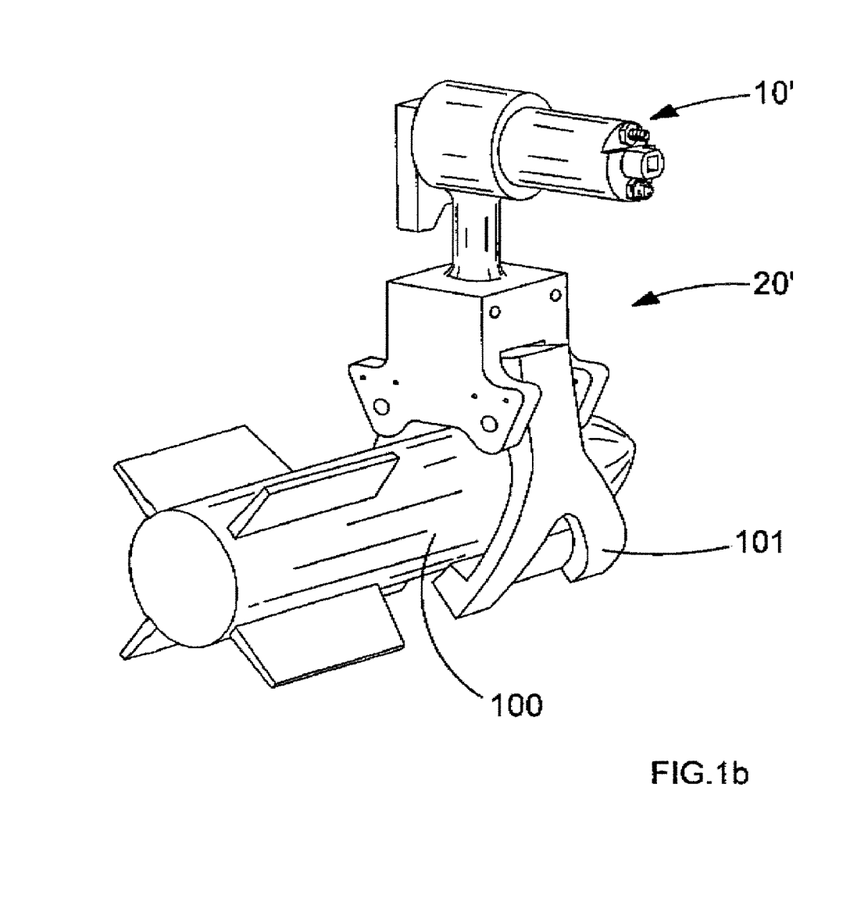
FIG. 1b shows a single ejector release unit for practice stores and suitable for use with a cartridge according to the invention.

FIG. 1b shows a dummy store 100 mounted in clamps 101 of a single practice ejector release unit 20'. The unit 20' uses a single cartridge 10' (which can be the same cartridge as in FIG. 1a). Upon firing of the cartridge 10', an ejector piston (not shown) passing through the centre of the unit 20' is actuated. This causes the clamps 101 of the unit 20' to open and release the dummy store 100. It also causes the ejector piston to push the store downwardly.

Figure 2:
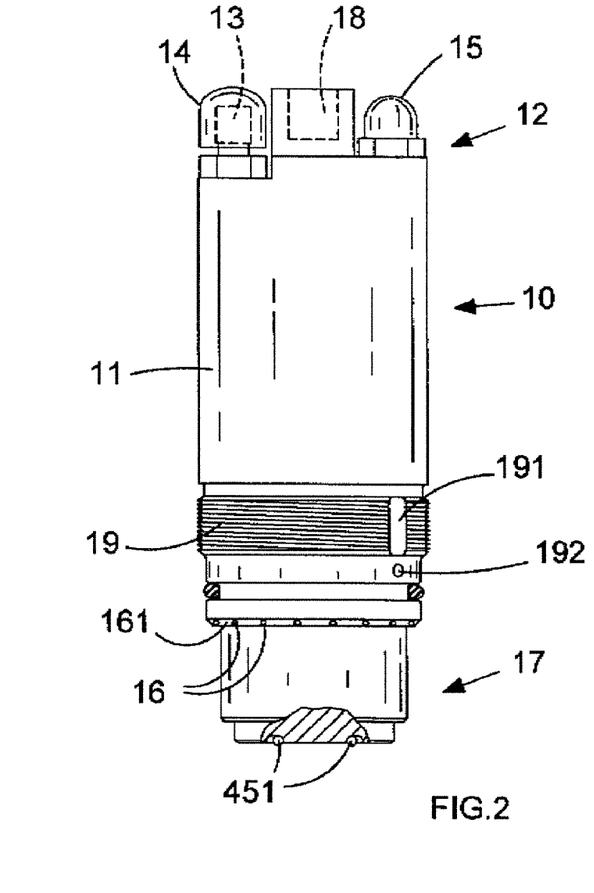
FIG. 2 shows the outside of a cartridge according to one embodiment of the invention.

FIG. 2 shows an outside view of one of the cartridges 10. The cartridge comprises a generally cylindrical body 11 having a proximal end 17 for insertion into an ejector release unit, and an opposite distal end 12. At the distal end 12 of the cartridge is located a charging valve 13, protected by a removeable cap 14. A pressure indicator 15 is also located at the distal end. A hexagonal screw drive socket 18 is located centrally in the distal end 12 of the cartridge 10, for applying torque to the cartridge 10 to screw it in place in the ejector release unit breech. A screw thread 19 is provided on the outside of the cartridge 10 toward the proximal end 17 for cooperating with a corresponding screw thread of the ejector breech.

Towards the proximal end 17 of the cartridge 10 is a chamfered face 161 extending around the circumference of the cartridge 10. Various holes 16 on the chamfered face 161, which could for example be circular or ovoid, form release passages to allow the escape of gas from the cartridge 10. The holes 16 are equi-spaced around the circumference of the cartridge and are normal to the chamfered face 161. The holes provide a large enough area for the escaping gas so as not to form a throttle.

Figure 3:
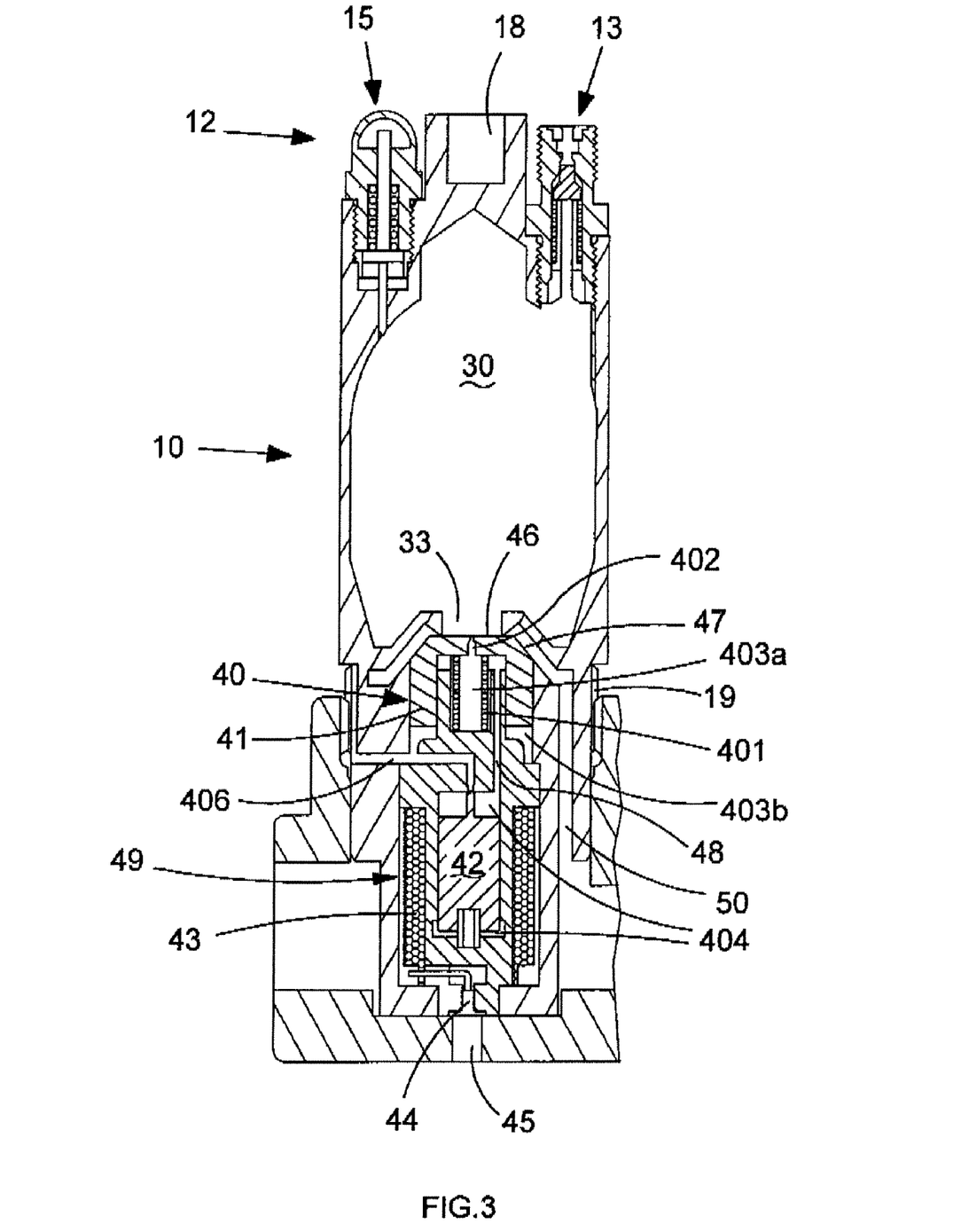
FIG. 3 shows a cross sectional view of a cartridge in accordance with another embodiment of the invention, the cartridge being in a "sealed" state and within a breech of an ejector release unit.

Referring to FIG. 3, the charging valve 13 (without its cap 14) and the pressure indicator 15 can be seen at the distal end 12 of a cartridge 10. In a central region of the cartridge is located a gas chamber 30. The gas chamber typically has a capacity of between 50 and 65 cubic cms. The gas chamber 30 is in fluid connection with the charging valve 13 and with the pressure indicator 15.

A release valve 40 is also in fluid connection with the gas chamber 30. The release valve 40 comprises a valve member 41. In a "sealed" state, a flat surface 46 of the valve member 41 abuts and covers an opening 33 in the gas chamber 30. The opening 33 has sharp, "knife-edges" which the flat surface 46 sits against. The valve member 41 also has an angled surface 47 around the peripheral edge of the flat surface 46. The angled surface 47 abuts and covers an internal fluid passage 50. The passage 50 is in fluid communication with the holes 16 of the cartridge 10. A small air passage 402 runs through the release valve 40. Hence, high pressure gas in the gas chamber 30 can pass through the passage 402 into a second chamber 403 behind the release valve 40. Hence, the release valve 40 has equal pressure either side of it. The release valve has a larger area on the "release valve chamber" side, than the "gas chamber" side and so the force from the gas either side of the release valve acts to urge the release valve against the gas chamber opening 33 and remain closed. The release valve is also urged into this "sealed" state by a spring 401 forcing the underneath surfaces 46, 47 of the release valve 40 upwardly in the figure. The spring 401 is located behind the release valve 40 in the second chamber 403 so as to act from the opposite side of the release valve 40 from the gas chamber 30.

The second chamber 403 is linked via a small internal passage 48 to a third chamber 404. Hence, this third chamber 404 and the passage 48 also contain high pressure gas from the gas chamber 30.

The third chamber 404 contains a moving pole 42 of a solenoid switch 49. The third chamber 404, and therefore the moving pole 42, is located within the centre of a solenoid coil 43. The moving pole 42 is arranged to move with the valve member 41.

The moving pole 42 is shaped so as to block off a passage 406 connected to the third chamber 404 when the cartridge is in the "sealed" state and the release valve 40 is urged towards the gas chamber 30 by the spring 401 and the gas force. The passage 406 is connected to the outside of the cartridge 10 through a hole 192 in the vicinity of the screw thread 19 of the cartridge 10 (shown in FIG. 2). The screw thread is also broken 191 in the vicinity of the hole to allow gas through the screw thread 19. Hence, gas present in the passage 406 can escape through the thread between the cartridge 10 and the ejector release unit breech. This passage provides for a slow time/safety vent. The passage is also connected to a section 403b of the second chamber 403 that is substantially sealed against the rest of the second chamber 403a. Hence, only a limited amount of gas can escape from the second chamber 403 to the passage 406. The section of the second chamber 403b is sealed from the rest of the chamber 430a by part of the valve member 41 being present in the second chamber 403. Hence, the pressurised cartridge 10 will eventually discharge through passage 406 via second chamber 403 without intervention. This will happen if a charged cartridge is stored for a long time.

The coil 43 is electrically connected to an electrode 44. The coil 43 is made of fine wire. In this example, the solenoid switch 49 only draws 2.2 amps of current to fire the cartridge, whereas a conventional hot gas cartridge needs to draw 5 amps to be fired. Hence, fine wire can be used in the coil 43, as opposed to wire of a larger diameter (0.5-1 mm) such as is used for hot gas cartridges. The electrode is located adjacent a firing pin hole 45. The firing pin hole 45 is adapted to interface with an electrical firing pin (not shown) of an existing ejector release unit 20 when installed. The cartridge includes a seal or seals 451 (shown in FIG. 2) in the vicinity of the electrode 44. The seal prevents escaping gas accessing the firing pin of the unit 20 and therefore protects the pin from damage.

Figure 4:
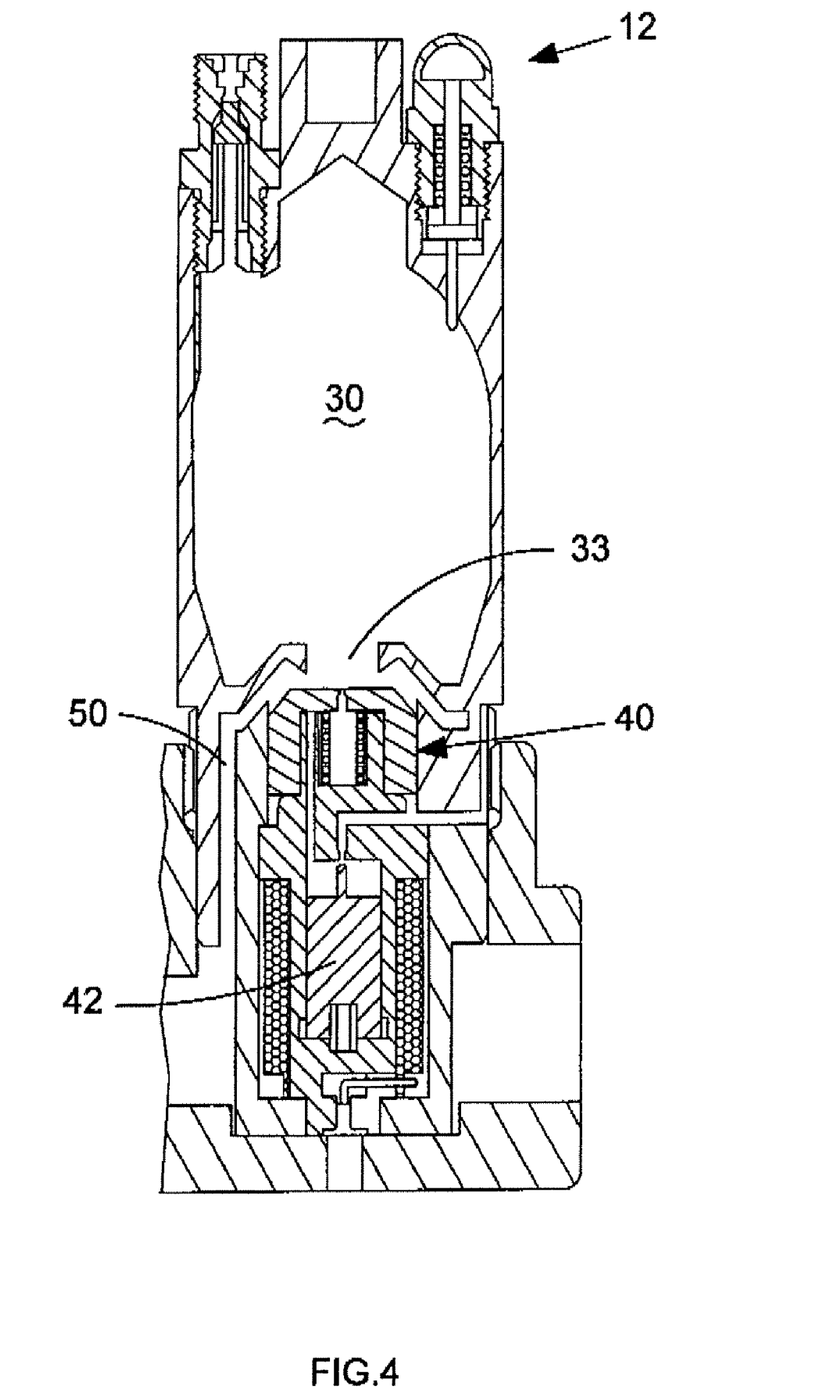
FIG. 4 shows the cartridge of FIG. 3 in a "fired" state.

FIG. 4 shows the same cartridge 10 in a "fixed" state. In use, the operation of the firing pin causes the moving pole 42 to move towards the proximal end 17 due to the coils 43 being activated, causing the valve member 41 to move away from the gas chamber and air passage 50. Many coils of fine wire provide quick movement of the moving pole 42. The release valve 40 opens such that the valve member 41 no longer abuts the opening of the gas chamber 33 or the air passage 50. Hence, the air passage 50 and the gas chamber 30 communicate with each other and pressurised gas moves from the gas chamber 30 through the air passage 50 and out of the holes 16 in the cartridge 10.

The electrical signal may be of sufficient duration to keep the release valve open to allow the gas to escape. For example, a duration of 25 ms has been found to be sufficient. Alternatively, a latch is used to hold the moving pole 42 in its "fired" position and keep the release valve open.

The moving pole 42 no longer blocks the passage 406 and so gas from the second chamber 403, the passage 48 and the third chamber 404 can escape through the passage 406 and the broken 191 screw thread 19 and hole 192 of the cartridge 10.

The system of interconnected passages 48, 406 and enclosed second and third chambers 403, 404 within the cartridge allows the cartridge to operate effectively without the use of a large number of seals. The system of chambers and passages is enclosed by the walls of the cartridge with the only escape routes for the gas being passages 406 and 50. Hence, the cartridge relies on few seals to contain the gas. This is advantageous as this reduces the amount of leak of gas from the cartridge, especially when the gas is at a high pressure. Furthermore, the gas chamber can be charged to a lower pressure than otherwise would be expected as less leakage has to be allowed for.

Figure 5:
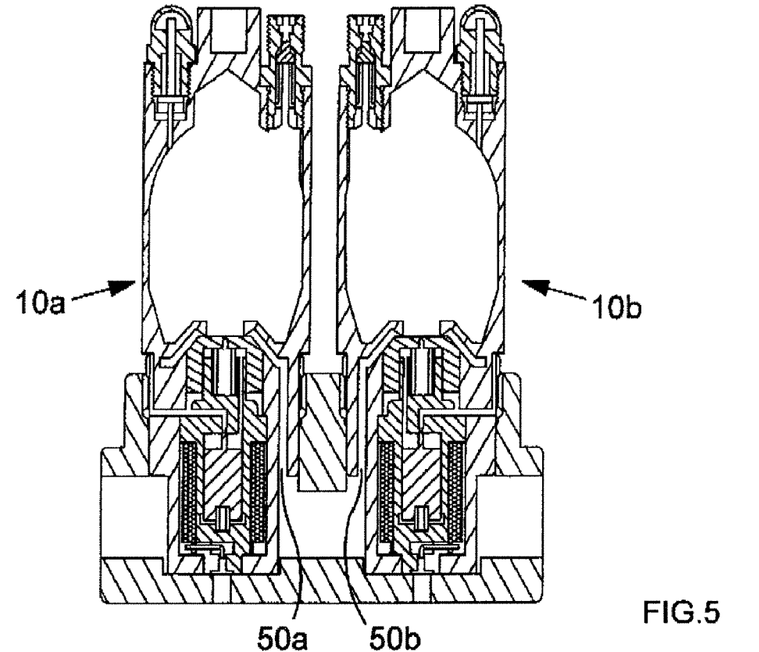
FIG. 5 shows a pair of the cartridges of FIG. 3, both cartridges being in a "sealed" state and within a breech of an ejector release unit.
Figure 6:
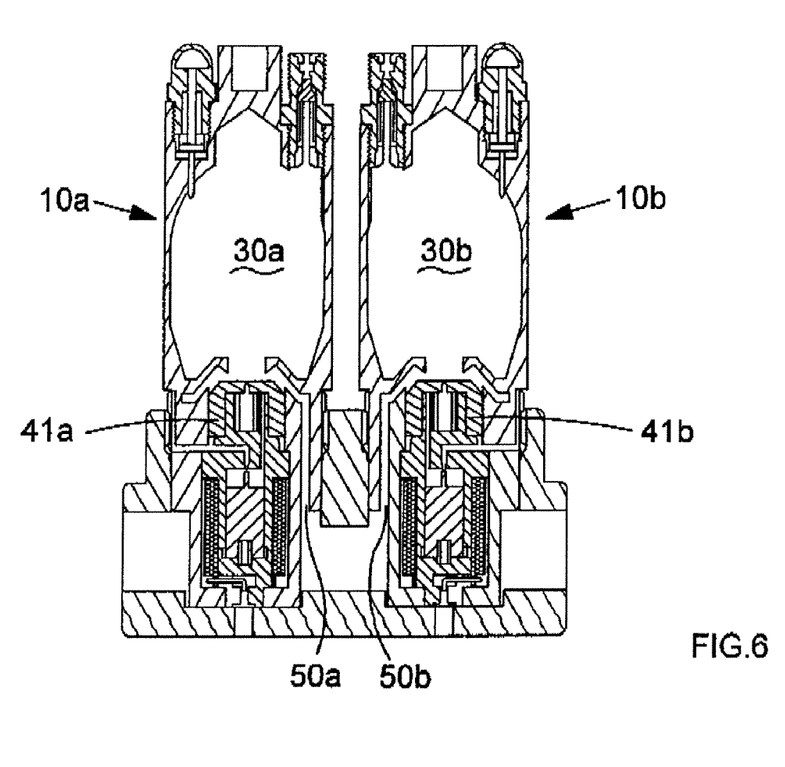
FIG. 6 shows the pair of cartridges of FIG. 5 in a "fired" state.

Referring to FIGS. 5 and 6, "sympathetic" firing between two cartridges will now be described.

FIG. 5 shows a pair of cartridges 10a and 10b in a "sealed" state. It can be seen that the air passage 50a of the first cartridge 10a is in fluid communication with the air passage 50b of the second cartridge 10b.

In FIG. 6, the same pair of cartridges 10a and 10b are in a "fired" state. The first cartridge 10a has been electrically fired. The second cartridge 10b has been sympathetically fired by the first cartridge 10a. The release valve 40a of the first cartridge 10a has been opened by activating the solenoid switch 49. Gas then escapes from the gas chamber 30a into the air passage 50a. This gas can then move into air passage 50b in the second cartridge 10b. This causes pressure to be exerted on the angled surface 47b of the second release valve member 41b to overcome the force of the spring 401 acting to close the valve 40b and therefore causing the valve 40b to open. The pressure exerted on the sloping surface 47b is typically no lower than 360 psi (25 MPa). The valve member 41b then moves towards the proximal end 17 of the cartridge relative to and independently from the moving pole 42. Hence, the moving pole 42 remains in its "closed" position, i.e. it has not been operated and thus does not move towards the proximal end 17 of the cartridge into its "fired" position.

In use, a cartridge 10 as described above is charged with gas. The gas could be filtered dry air or nitrogen. The gas is charged into the gas chamber 30 via charging valve 13. The pressure indicator 15 detects a pressure of above a set limit and exposes a red band to indicate that the cartridge is ready for use. The typical pressure for the gas in the gas chamber is, for example, 8300 psi (57 MPa) at ambient conditions. The set limit for the pressure indicator represents a pressure level sufficient for ejecting stores. This pressure may be approximately 4800 psi (33 MPa). To give a pressure of 4800 psi (33 MPa) whilst allowing for leakage of gas and the possibility of very cold conditions in flight, the gas chamber 30 may for example be charged to a pressure of 8300 psi (57 MPa) at ambient conditions. This may result in a pressure in the gas chamber 30 of 12500 psi (86 MPa) when at hot conditions. A cartridge charger (not shown) automatically charges at an ambient temperature of 20° C. and a pressure of 8300 psi (57 MPa).

The cartridge is then mounted in an ejector release unit 20. Two such cartridges 10 are commonly mounted in the ejector release unit. The cartridges are arranged so that the firing pin holes 45 interface with the fixing pins in the ejector release unit 20. The cartridges are, for example, mounted in the ejector release unit by screwing in with a torque of approximately 50 Nm. A pre-loaded torque is needed to ensure the cartridge is not dislodged by vibrations experienced during flight conditions. The screw thread 19 of the cartridge that interfaces with the breech of the ejector release unit may be made from high strength steel. The cartridge 10, for example, has a mass of less than 800 g.

Upon receipt of the electrical firing pulse, an electrical current is initiated through the coiled wire 43 in the solenoid switch 49. The electrical signal is for example a voltage of between 18 and 30 volts DC of 25 ms duration and draws a current of approximately 2.2 amps. This causes the moving pole 42 to move towards the coil 43. This in turn pulls the release valve member 41 downwardly in the figure, towards the proximal end 17. This causes the gas to escape through the air passage 50 and out through holes 16 in the cartridge 10. The gas then operates the ejector release unit to release the store in a controlled manner. The gas passes to an ejector piston (not shown) which causes the operating arm to pivot. This in turn causes the connecting rods to move and cause the hooks 28 to release the store lugs of the store and release the store. At the same time, gas passes through passages 24 in the ejector release unit 20 to ejector pistons (not shown) towards the outer ends of the unit 20. These pistons act downwardly on the upper surface of the store to cause the store to be ejected away from the aircraft.

The release valve 40 fully opens, for example, within 12 milliseconds of an electrical signal of 28 volts being used. The cartridge is also preferably able to cope with a voltage spike of down to −200 volts and up to +250 volts applied for 5 microseconds. Once the pressure in the gas chamber is below a certain threshold, the pressure indicator 15 red band drops out of sight. This indicates that the cartridge has been fired.

If only one of the cartridges is successfully electrically fired, and the other fails to fire, it is sympathetically fired by the pressure of the escaped gas acting on the second release valve 40b as explained above. This is important to ensure that the store is safely released even in the event of partial failure of the firing circuit.

After the cartridges 10 have been fired and the gas from the chamber 30 has escaped, the cartridges can be re-filled and re-used. First, the release valve 40 is shut. Gas is then injected in to the chamber 30 thought the charging valve 13. The cartridge 10 can then be re-used.

Instead of firing a filled cartridge in the usual way (as described above), the gas chamber 30 can be emptied, either partially or completely, through the charging valve 13. This may be done prior to storage, for example.

The invention claimed is:

1. A cartridge for use in an ejector release unit, the cartridge comprising:
   a gas chamber for containing gas under pressure,
   an outlet of the gas chamber for releasing the gas to drive a release mechanism in the ejector release unit,
   a release valve associated with the outlet and arranged to be operable to open the outlet upon activation of a firing pin of the ejector release unit, wherein the release valve is electrically operable and comprises a solenoid and electromagnet, and wherein the release valve is operable in an opening direction by gas pressure, and
   a bleed air passage communicating with the release valve such that the valve is operable to open as a result of the bleed air passage receiving pressurised gas,
   wherein the cartridge is reusable and is configured to be secured in a breech of the ejector release unit.

2. A cartridge as claimed in claim 1 wherein the release valve is operable by means of an electrode arranged to be aligned with the firing pin of the ejector release unit.

3. A cartridge as claimed in claim 1 wherein the release valve comprises a valve member and the bleed air passage is in fluid communication with a surface of the release valve member so that pressurised gas received in the bleed air passage acts on that surface to force the release valve member to move away from the bleed air passage.

4. A cartridge as claimed in claim 3 wherein the release valve member is contained within a release valve chamber of the cartridge adjacent the gas chamber, and the release valve member has a gas passage extending there through providing fluid communication between the gas chamber and the release valve chamber.

5. A cartridge as claimed in claim 4 wherein the release valve chamber comprises a first section receiving gas from the gas chamber, and a second section separated from the first section by a portion of the release valve member so as to be in limited fluid communication with first section.

6. A cartridge as claimed in claim 5 wherein the electromagnet is contained in an electromagnet chamber which is in fluid communication with the first section of the release valve chamber via an internal passage of the cartridge.

7. A cartridge as claimed in claim 1 wherein the cartridge comprises a vent passage extending to the outside of the cartridge allowing gas to vent out of the cartridge.

8. A cartridge as claimed in claim 7 wherein the vent passage comprises a hole adjacent a screw thread of the cartridge and a broken section of thread in the cartridge or the ejector release unit breech.

9. A cartridge as claimed in claim 7 wherein:
   the release valve is electrically operable and comprises a release valve member, a solenoid, and an electromagnet, and the electromagnet is contained in an electromagnet chamber, and
   the vent passage communicates with the electromagnet chamber when the release valve member is in an open position.

10. A cartridge as claimed in claim 5 wherein the cartridge comprises a vent passage extending to the outside of the cartridge and allowing gas to vent out of the cartridge, and the vent passage communicates with the second section of the release valve chamber.

11. A cartridge as claimed in claim 1 wherein the gas chamber within the cartridge is sealed by walls of the cartridge.

12. A cartridge as claimed in claim 1 wherein the release valve is closeable such that the used cartridge can be charged with compressed gas.

13. A cartridge as claimed in claim 1 wherein the gas chamber includes a one-way charging valve.

14. A cartridge as claimed in claim 1 wherein the cartridge comprises a seal arranged for preventing released gas from coming into contact with the firing pin of the ejector release unit breech.

15. An ejector release unit for an aircraft comprising the cartridge of claim 1.

16. An ejector release unit for an aircraft comprising a pair of cartridges of claim 1.

17. A cartridge as claimed in claim 6, wherein the internal passage, the gas chamber, the release valve chamber, and the electromagnet chamber within the cartridge are sealed by walls of the cartridge.

18. A cartridge as claimed in claim 1, wherein the cartridge is removable for recharging the cartridge with gas under pressure.

19. A cartridge as claimed in claim 1, wherein the cartridge is removable for storing the cartridge.

20. A cartridge for use in an ejector release unit, the cartridge comprising:
   a gas chamber for containing gas under pressure,
   an outlet of the gas chamber for releasing the gas to drive a release mechanism in the ejector release unit,
   a release valve associated with the outlet and arranged to be operable to open the outlet upon activation of a firing pin of the ejector release unit, wherein the release valve is electrically operable and comprises a solenoid and electromagnet, and wherein the release valve is operable in an opening direction by gas pressure, and
   a bleed air passage communicating with the release valve such that the release valve is operable to open as a result of the bleed air passage receiving the pressurised gas,
   wherein the cartridge is reusable and is configured to be releasably secured in a breech of the ejector release unit, and
   wherein the cartridge is arranged to be rechargeable with gas under pressure after being released from the breech and before being releasably resecured in the breech.

* * * * *